No. 706,143. Patented Aug. 5, 1902.
J. J. WOOD.
MEANS FOR CONTROLLING ELECTRIC CIRCUITS.
(Application filed June 28, 1901.)
(No Model.) 2 Sheets—Sheet I.
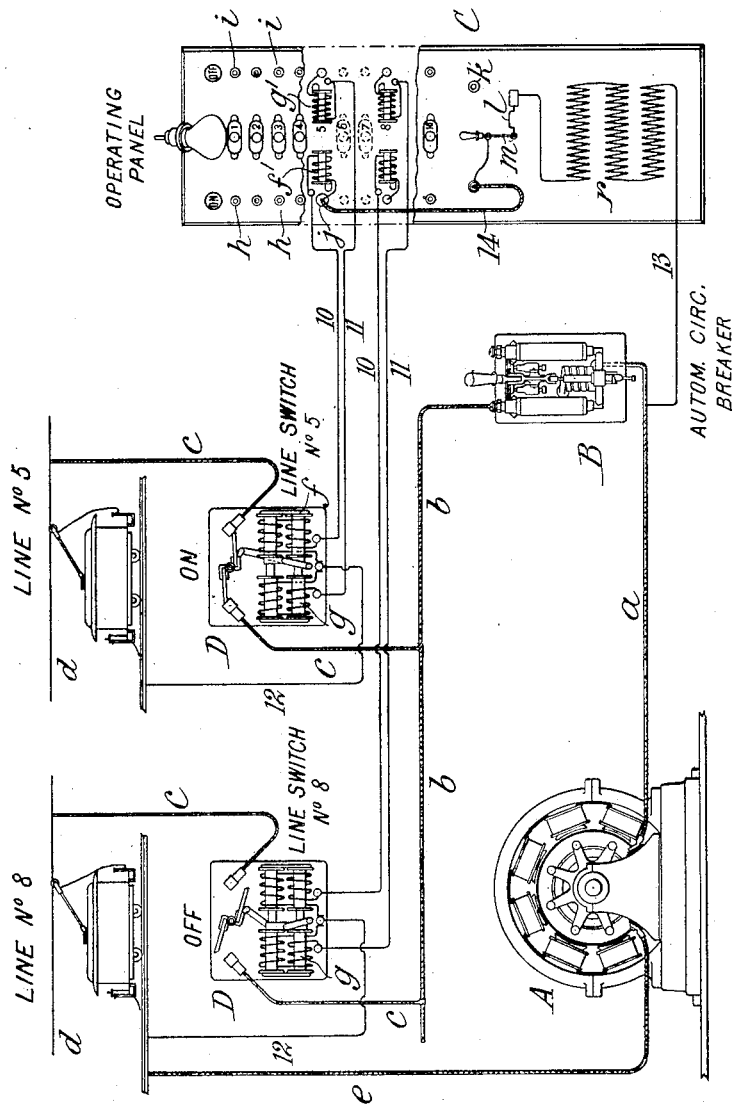
WITNESSES:
Rene Bruine
Fred White
INVENTOR:
James J. Wood,
By Attorneys,

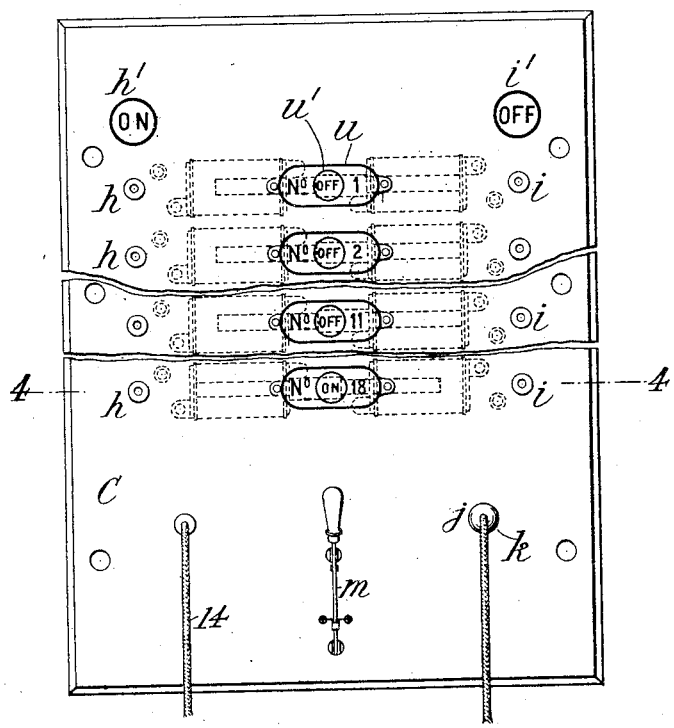
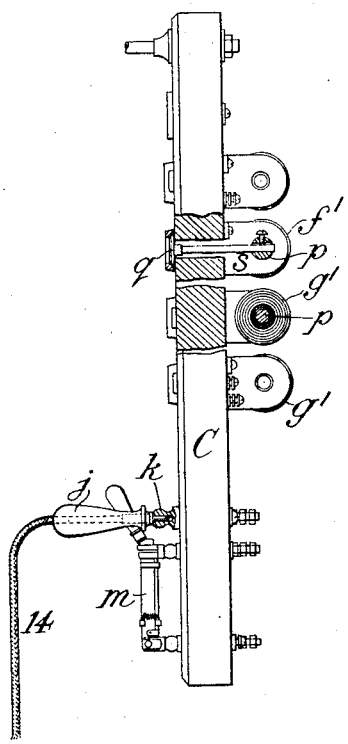
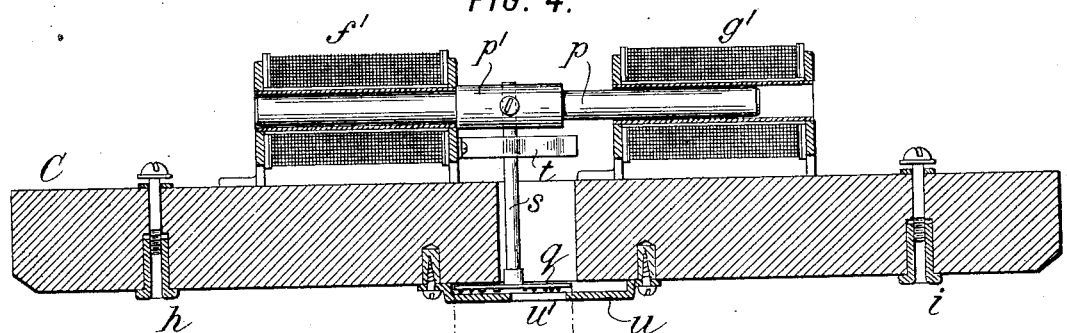
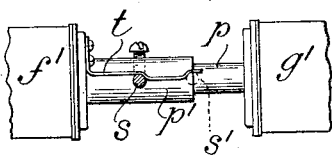

UNITED STATES PATENT OFFICE.

JAMES J. WOOD, OF FORT WAYNE, INDIANA.

MEANS FOR CONTROLLING ELECTRIC CIRCUITS.

SPECIFICATION forming part of Letters Patent No. 706,143, dated August 5, 1902.

Application filed June 28, 1901. Serial No. 66,334. (No model.)

*To all whom it may concern:*

Be it known that I, JAMES J. WOOD, a citizen of the United States, residing at Fort Wayne, in the county of Allen and State of Indiana, have invented certain new and useful Improvements in Means for Controlling Electric Circuits, of which the following is a specification.

This invention relates to means for controlling from a central or power station the supply of electric power or energy to a series of line-circuits. It is particularly applicable to electric-railway service where several lines or circuits covering different territory or different car-routes are all fed from one central station.

In electric-railway service it is desirable to center in one central station the power generation for as many individual lines or trolley-circuits as possible within certain practical limits as to distance of transmission. It is customary to feed a plurality of such line-circuits from a single dynamo or from a plurality of dynamos coupled in parallel. It is customary and preferable to carry the electric current or power from the power-stations to the separate lines by means of one or more cables, the individual lines taking off the current from the main cables through line-switches or circuit-breakers, so that each line has its own line-switch, by which it may be cut out of the system in case of any short circuit or other defect. These line-switches or cut-outs are consequently in many cases located at points remote from the central station. In some cases ordinary hand-switches are employed, while in others automatic circuit-breakers are used adapted to cut out any line automatically upon an increase of the current beyond the maximum normal or safety load. Commonly fuses are employed for this purpose adapted to blow when the current exceeds a certain maximum volume. When an overload or short circuit occurs upon any line, the fuse or circuit-breaker of that line operates and cuts out the line, thereby cutting off power from all the cars upon that line or trolley-circuit until the central station can be notified by telephone or otherwise and an operator is sent to repair the damage and again close the circuit at the fuse or circuit-breaker. In some cases a single circuit-breaker has been provided at the power-station adapted to break the main circuit in case of an overload or short circuit occurring upon any of the lines; but this has the disadvantage that a defect on one line stops traffic on all the lines of the system. In some instances, and especially where the power-house is centrally located, so that the several lines may, in effect, radiate from it, it is feasible to subdivide the circuit at the power-house, providing a separate cable for each line and providing a separate automatic circuit-breaker at the power-house for each line; but this involves the disadvantage of a very heavy expense for the conducting-cables.

My invention is designed to provide an improved means for controlling the several line-circuits from the central station. To this end I provide an automatic circuit-breaker in the main circuit at the central station and branch off the separate line-circuits at such points as shall effect the greatest economy in the copper cables. I provide each line-circuit with a separate line-switch, the switches being located at any necessary distance from the central station, and I connect each switch with the central station by a suitable circuit and provide means by which through these several circuits the line-switches can be operated from the central station. I also provide an operating-panel at the central station, through which to pass the current over any of the switch-circuits for operating the line-switches, and provide in connection with said panel or in any suitable arrangement at the central station a series of indicators, by which the operator can see at a glance the condition of each of the line-switches. By my system whenever a short circuit occurs on any line the main-circuit breaker at the central station operates and breaks the entire circuit. The operator then by manipulating the operating-panel opens all the separate line-switches. He then closes the main circuit at the circuit-breaker and then by again manipulating the operating-panel closes the several line-switches one by one in succession, thereby restoring current to the sound lines. Upon thus closing the defective line the main-circuit breaker is a second time operated to break the circuit, whereby the operator knows that the line just closed is defective, whereupon he cuts this line out, and by again closing the main-circuit breaker he restores the current to the sound lines already closed and proceeds to close any remaining ones, thereby restoring the entire system to operative condition, with the exception of the one line on which the defect has occurred. When this line has been repaired, it will be again closed by operating its line-switch from the central station.

My system provides for restoring the current to the several lines one by one and in succession, so that instead of attempting to start all the cars upon an entire system simultaneously, as is ordinarily done, only the cars upon each line will be started at one time, thereby reducing the demand upon the generators, the operator at the power-house thus having within his control the rapidity with which the entire load may be thrown upon the generators and being able to wait until the abnormal current due to the starting of the cars on the line last closed shall have ceased before closing the next line in the series. The overloading of the generators due to the effort of the motormen to start all the cars of a system simultaneously is thus avoided.

I will proceed to explain my invention with reference to the accompanying drawings, wherein—

Figure 1 is a diagrammatic view illustrating the circuit connections for two lines or trolley-circuits out of any number that may be employed in practice. Fig. 2 is a front elevation of the operating-panel, portions of which are broken out. Fig. 3 is a side elevation thereof, showing two of the indicators in section, the upper one or No. 2 indicator being in mid-section and the next or No. 3 being in section through one of the magnets. Fig. 4 is a horizontal section, on a larger scale, in the plane of the line 4 4 in Fig. 2. Fig. 5 is an elevation of the indicator-plate. Fig. 6 is a fragmentary front elevation of a portion of Fig. 4.

Referring to Fig. 1, let A denote the dynamo or power-generator, of which there may be one or more, as desired. Let B designate an automatic circuit-breaker of any suitable kind, adapted to automatically open the circuit upon the occurrence of a prescribed overload and adapted to be manually operated to close the circuit. Let C designate what I call an "operating-panel" and which will be fully hereinafter described. The foregoing parts are located at the central station or power-house.

I will assume that the central station furnishes power for a series of separate lines or trolley-circuits—say, for example, for ten such lines. Of these I have shown only two lines on the diagram—namely, those marked "Line No. 5" and "Line No. 8." The circuit connections shown consist of a conductor or cable $a$, leading from one terminal of the dynamo to the circuit-breaker B, a conducting-cable $b$, leading from the opposite terminal of the circuit-breaker out of the power-house to feed current to the several individual lines, and branch conducting-cables $c c$, taking current from the main cable $b$ and feeding it to the trolley-wire $d$ of the separate lines. The return-circuit is completed by a conducting cable or cables $e$ leading from the track-rails to the opposite terminal of the dynamo, (it being understood that in case a return trolley-wire is employed this return-circuit will of course lead from said wire instead of from the track-rails and also that in case of the third-rail system the conductors $c c$ will lead to such third rail instead of to the trolley-wire $d$.)

In the conductor or feeder $c$ for each line, circuit is introduced a line-switch D. In the diagram two of these switches are shown, one for Line No. 5 and the other for Line No. 8. These switches are adapted to be operated by a control or impulse sent from the central station. Any of the means employed for the distant operation of railway switches or signals may be employed for operating these electric switches—namely, hydraulic pressure, pneumatic pressure, or electromagnetism. I prefer electromagnetism, although my invention does not exclude any equivalent means of operation. Accordingly I have shown the switches D as provided each with operating-magnets $f$ and $g$, so arranged that the effect of the excitation of the magnet $f$ is to close the switch, as shown in line-switch No. 5, while the excitation of the magnet $g$ serves to open the switch, as shown in line-switch No. 8. The particular construction by which this result is accomplished is immaterial to my present invention. I may remark, however, that I have devised an electromagnetic switch especially adapted to the requirements of my present invention, the construction of which is fully set forth and claimed in a separate application, Serial No. 66,335, filed June 28, 1901, and to which reference may be made for a complete understanding of what I believe to be the construction of switch best adapted for this purpose. For the purposes of my present application it is sufficient to say that for each line-switch two circuit-wires are provided, the wire 10 leading to the coil of the closing-magnet $f$ and the wire 11 to the coil of the opening-magnet $g$, while the opposite ends of the coils of these magnets are joined together and connected to a wire 12, which may conveniently lead to the earth or to the track-rail, or otherwise, so as be in connection with the return-conductor $e$. Thus from each line-switch D two wires 10 and 11 are carried to the power-house.

The operating-panel comprises means for closing the circuit to any of the conducting-wires 10 or 11 and also an indicator for indicating the condition of the several line-switches. These circuit closing and indicating means might be independently arranged, but for convenience are preferably mounted on the one panel. It will be understood that the provision of a panel for holding these devices is not essential, but is merely a convenient way of grouping the several elements. The several wires 10 lead to corresponding terminals $h\ h$, which I have shown as conducting-sockets arranged in a vertical row underneath a plate $h'$, marked "On." In like manner the several wires 11 lead to terminals $i\ i$, which are shown as sockets arranged in a vertical row underneath the plate $i'$, marked "Off." A conducting-wire 13 branches from the main cable $a$ or $b$ and connects to a flexible cable 14, the free end of which is provided with a plug $j$, which normally is open-circuited, being conveniently thrust into a blind socket $k$, but which in use is adapted to be thrust into any of the series of sockets $h$ or $i$. It will be understood that my invention is not limited to the employment of a flexible cable 14 and plug $j$, as any other means of closing the circuit to any of the terminals $h$ for the wires 10 or the terminals $i$ for the wires 11 may be employed instead. It will also be understood that taking current from the main dynamo is not essential, as it might be taken from some other source; but it is most convenient to take it from the main generator. By reason of the high electromotive force commonly employed in railway-service I prefer to introduce a resistance $r$ between the main conductor $a$ and the flexible cable 14, suitably proportioned to reduce the current that will be sent over the wires 10 or 11 to any desired extent. I also prefer to provide a safety-fuse $l$ and a snap-switch or circuit-breaker $m$ in the conducting-wire 13.

The indicator comprises a series of indicating plates or tablets arranged, preferably, in a vertical series, each of the tablets being suitably connected to an armature or movable member controlled by two electromagnets, the coil of one magnet $f'$ being connected in the wire 10, so as to be in series with the coil of the magnet $f$ of the line-switch, while the coil of the other magnet $g'$ is connected in the wire 11, so as to be in series with the coil of the magnet $g$ of the line-switch. The preferred construction is that shown in Figs. 2, 3, and 4, where the magnet-coils $f'$ and $g'$ are suitably mounted behind the panel-board and on the same horizontal axis, so as to constitute solenoids, the armature being formed as a single core $p$, entering the spools of both coils and adapted to be attracted to right or left, according as one coil or the other is excited. Its movement is limited by an enlargement or boss $p'$ at the middle portion of the core, which at each end of its movement strikes one of the spools and is connected to the indicating-tablet $q$ by a rod or stem $s$. To prevent any rebound or displacement of the core and tablet, I provide a spring $t$, as shown in Figs. 4 and 6, the spring being so bent as to form a projecting portion, which drops in behind the stem $s$ after each movement and resists its return movement. In Fig. 6 one position of the stem is shown in full lines at $s$ and the other position in dotted lines at $s'$. Each tablet $q$ is guided and partly concealed by an indicator-plate $u$, fastened on the front of the panel-board and having a central hole $u'$, through which a portion of the tablet $q$ may be seen, as indicated by the dotted circle in Fig. 5. Each tablet $q$ is shown as provided on its front face with the words "Off" and "On," although any other indicating means, such as other characters or colors, may be substituted. As shown, each indicator is arranged to expose the word "On" when its corresponding line-switch is on or closed and to expose the word "Off" when the corresponding line-switch is off or open. As shown, the several indicators are conveniently arranged in a vertical series or row, the plates $u\ u$ being numbered consecutively to correspond with the several line-circuits and line-switches. By arranging the sockets $h$ and $i$ to right and left of the respective indicator-plates $u$ these several plates serve conveniently for numbering not only the indicators, but also the circuit-closing terminals.

The automatic circuit-breaker B (shown in Fig. 1) is known as the "Wood blow-out circuit-breaker," of the construction set forth in my application for patent filed May 8, 1901, Serial No. 59,232, this being a suitable and convenient construction of circuit-breaker for the purpose.

It will of course be understood that my system as thus described may be duplicated or multiplied as occasion requires. For example, the central station or power-house may feed two or more main circuits, each of which will be provided with a circuit-breaker B and operating-panel C, and each will radiate to feed a distinct group of line or trolley circuits.

Normally the several line-switches are closed, and current is being supplied to cars on all the lines. In case a serious short circuit or overload occurs in any line the automatic circuit-breaker B operates and breaks the main circuit. This of course cuts off the power from all the lines and stops the cars. The operator at the power-station is made aware of the operation of the circuit-breaker by the noise it makes, or, if this be insufficient, his attention may be directed to it in any other way. If there be more than one such circuit-breaker, he can tell by examining them which has acted. If it be the Wood blow-out circuit-breaker, already referred to, he will know that the one whose handle is thrown down is the one which has acted. Then he goes to the operating-panel and takes the testing-plug $j$, which he thrusts successively into off-sockets $i\ i$, Nos. 1, 2, 3, &c., through the whole series. The effect of each of these operations is to send a current over the circuit 13 14 11 12 to energize the left-hand magnet $g$ of the line-switch D, corresponding in number to the socket plugged, and thus to throw this switch to the off position and open the corresponding line-circuit and at the same time to energize the right-hand magnet g' of the indicator and throw the latter to the position showing "Off." Thus all the lines are opened in succession, and all the indicators show "Off." When all have been thus opened, (and not before, for up to this time the operator does not know on what line the accident has occurred,) he closes the automatic circuit-breaker B. This of itself produces no effect, since all the line-switches are open. He next takes the testing-plug j and thrusts it successively into the on-sockets h h, Nos. 1, 2, 3, &c. Assuming the short circuit to have occurred on line No. 8, the effect of this operation on each of Nos. 1 to 7 will be to send a current over circuit 13 14 10 12 to energize the right-hand magnet f of the line-switch corresponding in number to the socket plugged, and thus to throw this switch to the on position and close the corresponding line-circuit and at the same time to energize the left-hand magnet f' of the indicator and throw the latter to the position showing "On." Thus the power is turned onto each line in succession, and the cars on each may start. On plugging No. 8 the same operation is performed, except that the instant the line No. 8 is closed (if the short circuit still exists) the rush of current again operates the automatic circuit-breaker, and the current is again cut off from the whole system; but this operation tells the operator that the defect exists in line No. 8, whereupon he instantly replugs the off-socket of No. 8 on the panel, thereby again opening the line-switch of line No. 8, and immediately after restores the power to lines Nos. 1 to 7 by again closing the circuit-breaker. The interruption of current from these lines will have been so short that the cars already started will scarcely be affected. Then supposing that line No. 8 is the only one defective (it being improbable for a short circuit to occur on more than one line at a time) the operator will proceed to turn on the lower to lines Nos. 9, 10, &c., up to the full number of lines in the system, having only the defective line (No. 8) open. Repair men will then be sent out to correct the damage on the defective line, and when the power-house is notified (by telephone or otherwise) that the line is restored to normal condition the operator will plug into the on-socket of No. 8 on the panel, and thereby will turn the current onto this line.

It will be evident that the details of my invention may be greatly modified without departing from its essential features. For example, instead of having two wires 10 and 11 leading from the power-house to each of the line-switches and using one wire for turning the switch on and the other for turning it off it will be apparent to any electric engineer that a single wire might be employed by passing the current over it in one direction for turning it on and in the contrary direction for turning the switch off by suitably modifying the electromagnetic means for operating the switch and the circuit-closing means, as would be understood by any competent electrician. Any other circuit-closing means is applicable in place of that with which I have shown the operating-panel to be provided. Any other construction of automatic circuit-breaker may be substituted for that shown. The function of the automatic circuit-breaker which is to my invention important and essential is that it shall act as an overload device or indicator, showing to the operator at the central station when the conductors are carrying an abnormal current. Hence any suitable overload-indicator would serve the purpose; but in practice, as it is important to break the circuit when such overload occurs, a circuit-breaker automatically acting upon the occurrence of the overload is used. The precise construction of the several indicators may be varied according to any of the indicating means that are known in the electric art.

What I claim is—

1. In an electric distributing system the combination of a dynamo, a main-circuit conductor and branch lines normally fed therefrom, an automatic circuit-breaker in the main circuit at the central power-station, a line-switch in each line, and means for operating said line-switches from said power-station.

2. In an electric distributing system the combination of a dynamo, a main-circuit conductor and branch lines fed therefrom, an automatic circuit-breaker in the main circuit, a line-switch in each line, means for operating said line-switches from the central power-station, and indicators at said station connected to said operating means and adapted to indicate the condition of the corresponding line-switches.

3. The combination with a dynamo and main circuit and branch lines normally fed therefrom, of an automatic circuit-breaker in the main circuit electromagnetically-operated line-switches controlling the respective lines, circuit-wires leading from said switches to the central station, and circuit-closing means at said station adapted to send a current over any wire to operate the corresponding line-switch.

4. The combination with a dynamo and main circuit and branch lines fed therefrom, of electromagnetically-operated line-switches controlling the respective lines, circuit-wires leading from said switches to the central station, circuit-closing means at said station adapted to send a current over any wire to operate the corresponding line-switch, and electromagnetic indicators at said station corresponding to the respective line-switches and connected to said wires to be operated by the same current which operates the line-switch, and adapted to indicate the condition of the respective line-switches.

5. The combination with a dynamo and main circuit and branch lines fed therefrom, of line-switches controlling the respective lines, each switch having two oppositely-acting electromagnets for opening and closing the switch respectively, a pair of circuit-wires leading from the respective magnets of each switch to the central station, indicators at said station corresponding to the respective line-switches, each having two magnets connected respectively in the two wires leading from the corresponding line-switch, and circuit-closing means at the central station for sending a current over either wire to any line-switch, whereby to operate said switch and simultaneously to operate the indicator therefor to show the condition of the line-switch.

6. The combination with a dynamo and main circuit and branch lines fed therefrom, of electromagnetically-operated line-switches controlling the respective lines, circuit-wires leading from said switches to the central station, and there terminating in sockets, and a plug connected to a source of electric current and adapted to be inserted in any of said sockets to send a current over any wire to operate the corresponding line-switch.

7. The combination with a dynamo and main circuit and branch lines fed therefrom, of electromagnetically-operated line-switches controlling the respective lines, circuit-wires leading from said switches to the central station and there terminating in sockets, electromagnetic indicators at said station corresponding to the respective line-switches and connected to said wires, and a plug connected to a source of electric current and adapted to be inserted in any of said sockets to send a current over any wire to operate the corresponding line-switch and indicator.

8. The combination with a dynamo and main circuit and branch lines fed therefrom, of line-switches controlling the respective lines, each switch having two oppositely-acting electromagnets for opening and closing the switch respectively, a pair of circuit-wires leading from the respective magnets of each switch to the central station, indicators at said station corresponding to the respective line-switches, each having two magnets connected respectively in the two wires leading from the corresponding line-switch, said indicators arranged in a consecutive series, with terminals for said wires arranged also in consecutive series opposite their respective indicators, and circuit-closing means for connection with any of the respective terminals for sending a current over either wire to any line-switch, whereby to operate said switch and simultaneously to operate the indicator therefor to show the condition of the line-switch.

9. In a system for controlling electric circuits, the combination with electromagnetically-operated switches and wires leading thence to a central station, of operating means at said station comprising a series of circuit-terminals for said wires, a series of indicators having electromagnets operatively connected in the circuits of the respective wires, and circuit-closing means adapted to coact with said terminals to send a current over any of the wires to operate the magnets of the line-switch and indicator in connection with such wire.

10. In a system for controlling electric circuits, the combination with electromagnetically-operated switches and wires leading thence to a central station, of operating means at said station comprising a series of circuit-terminals for said wires, arranged consecutively, a series of indicators arranged consecutively and opposite the corresponding terminals, said indicators having electromagnets connected in the circuits of the respective wires, and circuit-closing means adapted to coact with said terminals to send a current over any of the wires to operate the magnets of the line-switch and indicator in connection with such wire.

11. In a system for controlling electric circuits, the combination with electromagnetically-operated switches and wires leading thence to a central station, of operating means at said station comprising a series of electromagnetic indicators arranged consecutively, two series of circuit-terminals for said wires arranged consecutively and opposite the respective indicators, and circuit-closing means adapted to coact with said terminals to send a current over any of the wires to operate the magnets of the line-switch and indicator in connection with such wire.

12. In a system for controlling electric circuits, the combination with electromagnetically-operated switches and wires leading thence to a central station, of indicators at said station comprising each a pair of electromagnetic coils, a movable member arranged to be attracted in opposite directions by the respective coils, and an indicating-tablet connected to and moved by said movable member.

13. In a system for controlling electric circuits, the combination with electromagnetically-operated switches and wires leading thence to a central station, of indicators at said station comprising each a pair of electromagnetic coils arranged in line, a core movable within said coils and attracted by each in an opposite direction, and an indicating-tablet connected to and moved by said core.

14. In a system for controlling electric circuits, the combination with electromagnetically-operated switches and wires leading thence to a central station, of indicators at said station comprising each a pair of electromagnetic coils $f'$ and $g'$, arranged in line, a core $p$ movable within said coils, an indicating-tablet $q$, and a stem $s$ connecting said tablet to said core.

15. In a system for controlling electric circuits, the combination with electromagnetically-operated switches, and wires leading thence to a central station, of indicators at said station, comprising each a pair of electromagnetic coils, and a movable member arranged to be attracted in opposite directions by the respective coils, and a retaining device coacting with said movable member for holding it in either position until attracted to the other.

16. In a system for controlling electric circuits, the combination with electromagnetically-operated switches and wires leading thence to a central station, of indicators at said station comprising each a pair of electromagnetic coils $f'$ and $g'$, arranged in line, a core $p$ movable within said coils, an indicating-tablet $q$ connected to said core by a stem $s$, and a spring $t$ engaging said stem to hold the core and tablet against displacement.

17. In an electric distributing system, the combination of a dynamo, a main-circuit conductor and branch lines normally fed therefrom, an overload-indicator in the main circuit at the central power-station, a line-switch in each line, and means for operating said line-switches from said power-station.

In witness whereof I have hereunto signed my name in the presence of two subscribing witnesses.

JAMES J. WOOD.

Witnesses:
W. H. CRIGHTON,
FRED T. HUNTING.